UNITED STATES PATENT OFFICE.

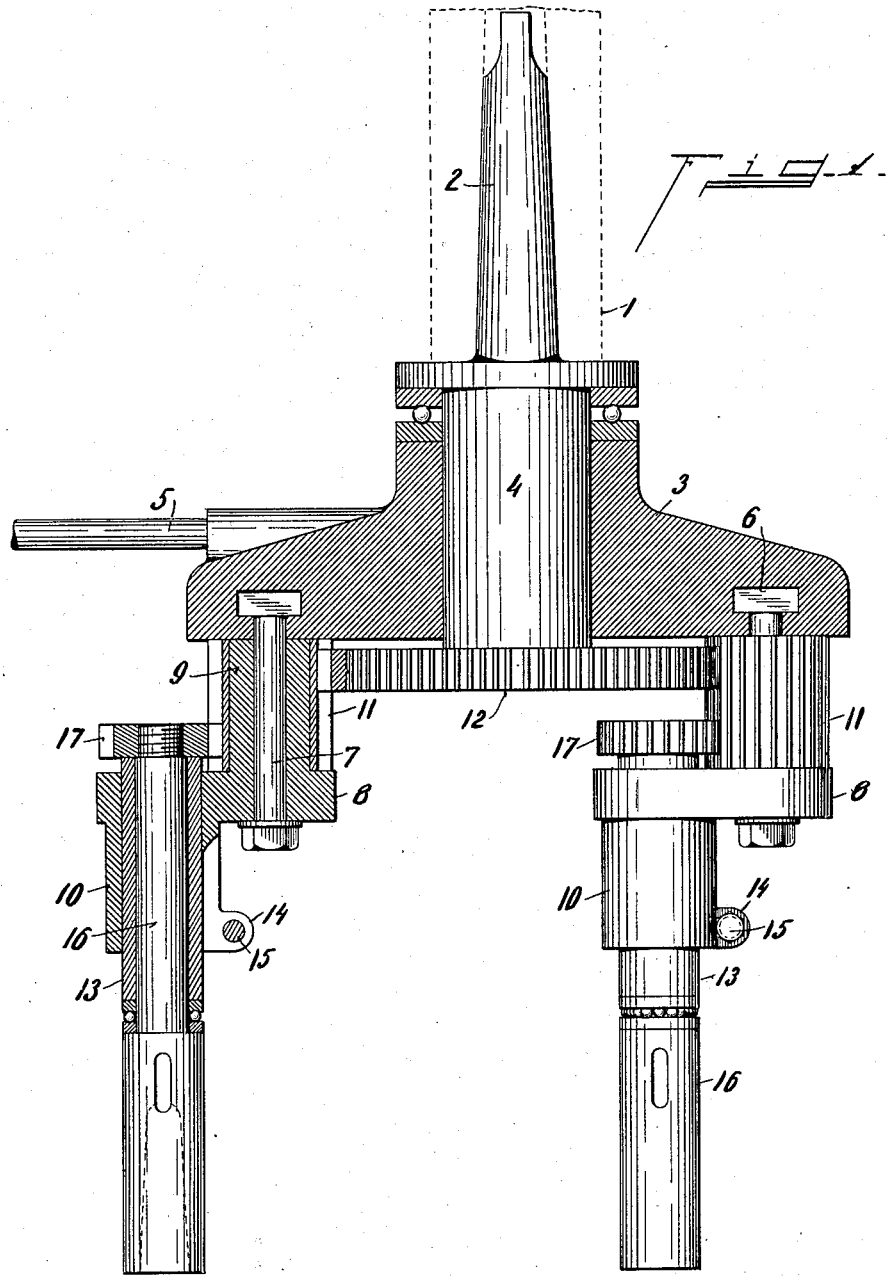

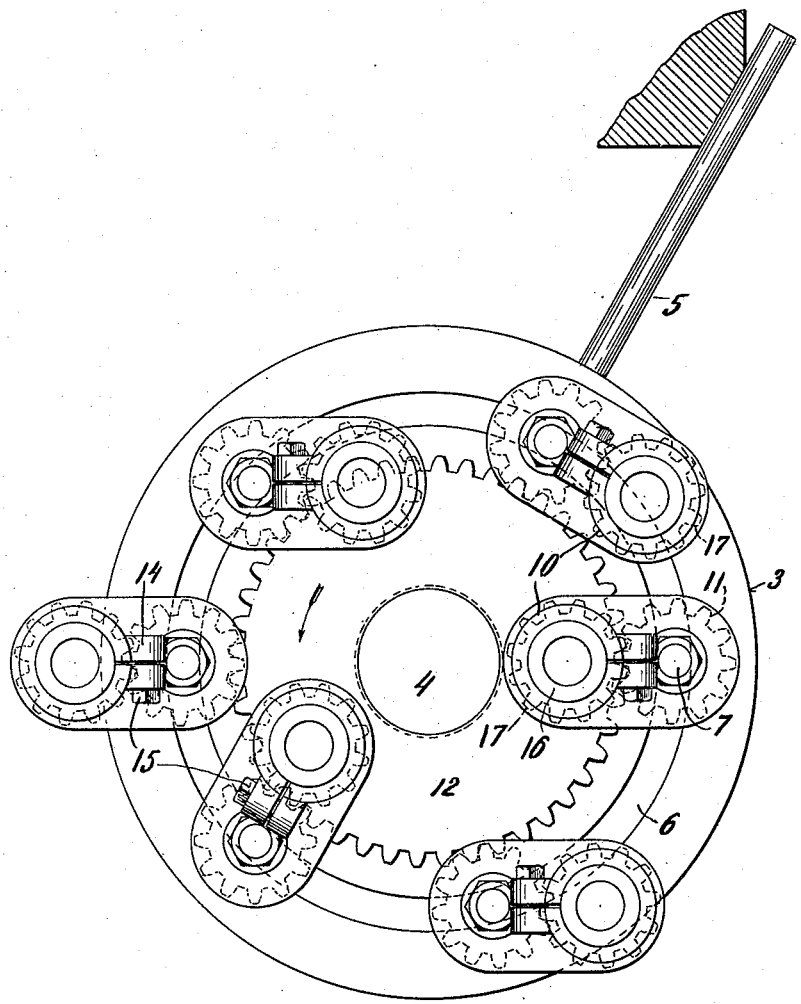

ALBERT P. KERN, JR., OF COVINGTON, KENTUCKY.

MULTIPLE-SPINDLE DRILL.

1,148,094.     Specification of Letters Patent.     Patented July 27, 1915.

Application filed August 18, 1913. Serial No. 785,447.

*To all whom it may concern:*

Be it known that I, ALBERT P. KERN, Jr., a citizen of the United States, residing at Covington, in the county of Kenton and State of Kentucky, have invented certain new and useful Improvements in Multiple-Spindle Drills, of which the following is a specification.

My invention relates to an improvement in drilling machine and primarily is contemplated as an attachment to the commercial type of drill presses or analogous metal cutting tools for multiple drilling. As an attachment it is capable of being connected within a drill receiving socket of the drill spindle, which serves as a driving or feeding element for a series of drills comprised in the attachment. It is provided with a non-rotative member upon which the various spindles of the series are adjustably mounted, each spindle being journaled and supported by a crank frame adjustably mounted upon said non-rotative frame member. All of the spindles of the series are in constant geared connection with a main gear concentric with the axis of the spindle of the drill press and each spindle is independently adjustable longitudinally for relatively alining the drills of the series or differentially positioning the same for drilling various depths to a given feed of the main drill spindle or driving element.

An object of my invention is to provide a multiple drilling device with a non-rotative frame member having a series of drill spindle supporting frames mounted thereon adjustable relatively to each other and toward and from a point common to all.

Another object of my invention is to provide a drilling device with a main driving gear having a non-rotative member concentric with the axis of the main gear upon which a crank frame or a series of crank frames are each adjustably mounted circumferentially around the main driving gear and a drill spindle adjustably mounted within a sleeved arm of the crank frame with a planetary system of gearing intervening between the main driving gear and drill spindle with the gears in constant intermesh and with one of the gears of an elongated form to permit the spindle to be adjusted longitudinally and circumferentially around the supporting axis of the crank frame.

Various other features of my invention relate to the details of construction, all of which will be more fully set forth in the description of the accompanying drawings, in which:—

Figure 1 is a central vertical section through my improved multiple drilling device, a portion thereof being illustrated in section with only two secondary drill spindles shown as members of the series. Fig. 2 is a bottom plan view of Fig. 1, illustrating, however, six spindles variously positioned.

My device, as illustrated, forms an attachment which may be conveniently applied to the spindle of a drilling machine, and in such use its series of spindles will be designated as secondary drill spindles, although the features of my invention are applicable to a special machine for multiple drilling. In the description herein, it will be primarily referred to as an attachment for any of the commercial types of drilling machines, and is provided with a shank for detachably connecting the same within the socket of the drill spindle, whereby the supplemental drill spindles are rotated by the main drill spindle, and elevated or lowered therewith in a drilling operation. It being understood that the main drill spindle may be comprehended as the driving and feeding element, and as the commercial types of drill presses are well-known in the art, the spindle having rotary and feeding motion it is deemed for the purposes herein that the mechanism for accomplishing said result need not be described or illustrated for a clear understanding of the invention. The main drill spindle 1 is shown in dotted lines, Fig. 1, which, as usually provided, has a tapering bore to receive the shank 2 of the attachment and frictionally connected therewith, to rotate the same. This connection may, however, be of any well-known construction or otherwise for a detachable connection.

3 represents a head-plate, in this instance preferably of circular form concentrically fitting the spindle 4 but non-rotative, the plate being provided with a rod 5 for connecting the same with any portion of the drill press to prevent rotation of the head 3 while allowing it to be raised and lowered by the spindle 1. Any means for binding or locking the head 3 against rotation may be provided other than the rod herein shown, with the rod, however, providing the simplest means for accomplishing this result. The lower face of the head 3 has a circumferential T-groove 6 providing a circumferential anchorage adapted to receive a T-bolt or anchor 7 for supporting a frame of a secondary or supplemental drill spindle and render the spindle circumferentially adjustable concentrically with the axis of the main drill spindle for relatively adjusting a series of secondary drill spindles.

As all of the secondary drill spindles of a series mounted upon the head 3 are of similar and duplicate construction, one will only be described herein in detail. 8 represents a sleeved spindle supporting frame or offset member provided with the oppositely disposed sleeve-extensions 9, 10. The sleeve 9 serves as a journal for the gear 11 which is loosely mounted thereon, with the T-bolt 7 projected concentrically through said sleeve 9 for rigidly bolting the same to the head 3 in any adjusted position either concentrically with the head axis or around the bolt 7 as an axis for adjusting the secondary drill spindle toward or away from the main axis. The spindle journal or offset member 8 therefor is adjustably connected to the circumferential anchorage of the head-plate or non-rotative member 3 and rotatively adjustable about its anchorage, axis or bolt 7. The spindle is journaled within the journal 8 eccentric to the anchorage axis and also longitudinally adjustable, without disturbing the gear transmission. The pinion 11 is preferably of elongated form and intermeshed with the main driving gear 12 fixed to the spindle 4. The gear 12 serves as the driver for all of the secondary drill spindles of the series. 13 represents a journal sleeve adapted to be frictionally clamped within the frame sleeve extension 10, said extension being split, with the split ends each provided with an ear 14 with which a screw 15 is engaged for clamping the journal sleeve rigidly to the frame, in any vertically adjusted position. 16 represents a secondary drill spindle, having its shank journaled and supported within the journal sleeve 13 and provided with a gear 17 intermeshed with the elongated gear 11. The gear 17 and spindle 16 move planetarily about the eccentric supporting axis on bolt 7. The purpose of the elongated gear 11 is to permit the secondary drill spindle and its sleeve to be vertically adjusted a limited degree within its supporting frame 8. By this arrangement, the various drills of the series may be relatively adjusted to different planes for drilling different depths of holes within the given feed of the main drill spindle, and also provides means for alining all the drills of the series. This construction of multiple drill attachment provides a universal adjustment of secondary drill spindles, concentrically around their supporting axis and concentrically around the axis of the main drill spindle, enabling each drill to be moved to different positions relatively as is shown in Fig. 2, offering an increased range of utility over attachments of this class known in the art, and in consequence thereof is capable of a variety of uses and not limited for drilling a particular kind of work.

The attachment may be applied to various types of metal cutting machines other than drill presses and the features herein may form a permanent part of a drilling machine, and, therefore, I do not wish to be limited in scope in making reference to my invention as an attachment for drill presses.

In the broader aspect of the invention the frame 3 may be viewed as a rigid support for a plural number of drill spindles upon which they are each independently concentrically and eccentrically adjustable about a common axis, or common driving member.

In providing the gear 11 of elongated form all of the gearing can be maintained in constant intermesh irrespective of the adjusted position of the drill spindle longitudinally or diametrically with respect to the axis of the main gear, and provides a universal adjustment of the drill spindle around its supporting axis which enables the spindle to be swung beneath or within the circumferential area of the main driving gear.

Having thus described my invention, I claim as new and desire to secure by Letters Patent of the United States:—

1. In a device of the nature disclosed, a non-rotatable supporting member, a driving gear coaxial therewith, an offset spindle carrying member mounted upon said supporting member and adjustable thereon circumferentially about the axis of said gear, a spindle journaled upon said offset member, and a pair of intermeshing gears journaled upon said offset member for rotating said spindle, one extending to a plane coincident with said gear and connected therewith.

2. In a device of the nature disclosed, a non-rotative supporting member having a circumferential spindle anchorage, a driving gear journaled in said support coaxially therewith, a spindle journal connected to the anchorage of said supporting member adjustable thereon and revoluble about its supporting axis, a spindle and gearing connecting said spindle and driving gear.

3. In a device of the nature disclosed, a non-rotative member having a circumferential spindle anchorage forming a base from which one or more spindles laterally extend, a spindle journal adjustably connected to the anchorage of said supporting member and extending laterally therefrom, a spindle journaled therein, and means for rotating said spindle.

4. In a device of the nature disclosed, a non-rotative member having a circumferential spindle anchorage forming a base from which one or more spindles laterally extend, an offset spindle journal adjustably connected to the anchorage of said member and extending laterally therefrom and rotatively adjustable about its axis, a spindle journaled in said journal concentric to said journal axis, and means for rotating said spindle.

5. In a device of the nature disclosed, a non-rotative member having a circumferential spindle anchorage forming a base from which one or more spindles laterally extend, a driving gear journaled concentrically within said anchorage, an offset spindle journal adjustably connected to the anchorage of said member and extending laterally therefrom and rotatively adjustable about its axis, a gear concentric upon said journal axis in mesh with said driving gear, a spindle within said journal eccentric to said journal axis, and a gear connecting said spindle with said second-named gear.

6. In a device of the nature disclosed, a non-rotative member having a circumferential spindle anchorage forming a base from which one or more spindles laterally extend, a driving gear journaled concentrically within said anchorage, an offset spindle journal adjustably connected to the anchorage of said member and extending laterally therefrom, a spindle within said journal eccentric to its journal axis and longitudinally adjustable therein, and transmission gears connecting said spindle with said driving gear.

7. In a device of the nature disclosed, a non-rotative member having a circumferential spindle anchorage forming a base from which one or more spindles laterally extend, means for supporting and journaling a spindle adjustably to the anchorage of said member in a laterally extended position, and eccentrically to its anchorage axis, a spindle therefor, and means for rotating said spindle.

8. In a device of the nature disclosed, a non-rotative member having a circumferential spindle anchorage forming a base from which one or more spindles laterally extend, a plural number of spindle journals, each adjustably secured to the anchorage of said member in a laterally extended position, a spindle for each journal, positioned eccentric to the anchorage axis, a driving gear common to all spindles, and transmission device for each spindle connecting with said gear.

In testimony whereof, I have hereunto set my hand.

ALBERT P. KERN, Jr.

Witnesses:
CLARENCE B. FOSTER,
OLIVER B. KAISER.

Copies of this patent may be obtained for five cents each, by addressing the "Commissioner of Patents. Washington, D. C."